United States Patent [19]

Kitamura et al.

[11] Patent Number: 4,761,462

[45] Date of Patent: * Aug. 2, 1988

[54] PACKAGING PROPYLENE COPOLYMER FILM

[75] Inventors: Shuji Kitamura, Nagaokakyo; Kiyohiko Nakae, Otsu; Tadatoshi Ogawa; Teruaki Yoshida, both of Takatsuki; Hajime Sadatoshi, Ichihara, all of Japan

[73] Assignee: Sumitomo Chemical Company, Limited, Osaka, Japan

[*] Notice: The portion of the term of this patent subsequent to Jun. 2, 2004 has been disclaimed.

[21] Appl. No.: 814,884

[22] Filed: Dec. 30, 1985

[30] Foreign Application Priority Data

Sep. 20, 1983 [JP] Japan ................................. 58-174864
Mar. 20, 1985 [JP] Japan ................................. 60-56209

[51] Int. Cl.$^4$ .................... C08F 210/06; C08F 210/08
[52] U.S. Cl. .................................. 526/159; 526/119; 526/137; 526/141; 526/142; 526/348.1; 526/348.5; 526/348.6; 526/904; 526/916
[58] Field of Search ............... 526/348.1, 348.2, 348.3, 526/348.4, 348.5, 348.6, 159

[56] References Cited

U.S. PATENT DOCUMENTS

| | | | |
|---|---|---|---|
| 3,332,921 | 7/1967 | Cleary | 526/348.6 |
| 4,168,361 | 9/1979 | Oda et al. | 526/348.6 |
| 4,252,851 | 2/1981 | Lansbury et al. | 526/348.6 |
| 4,308,361 | 12/1981 | Fujii et al. | 526/348.6 |
| 4,311,810 | 1/1982 | Fujii et al. | 526/348.6 |
| 4,322,514 | 3/1982 | Miyoshi et al. | 526/348.6 |
| 4,360,650 | 11/1982 | Desvignes et al. | 526/348.1 |
| 4,367,322 | 1/1983 | Shiga et al. | 526/348.6 |
| 4,404,342 | 9/1983 | Miyoshi et al. | 526/348.6 |
| 4,461,872 | 7/1984 | Su | 526/348.3 |
| 4,670,529 | 6/1987 | Kitamura et al. | 526/348.1 |

FOREIGN PATENT DOCUMENTS

| | | |
|---|---|---|
| 1720292 | 6/1971 | Fed. Rep. of Germany . |
| 2428651 | 1/1980 | France . |
| 1190396 | 5/1970 | United Kingdom . |

OTHER PUBLICATIONS

Encyclopedia of Polymer Science & Technology, Interscience Publ. N.Y. (1969) vol. 9, p. 647; vol. 11, pp. 613–614.

Primary Examiner—Edward J. Smith
Attorney, Agent, or Firm—Stevens, Davis, Miller & Mosher

[57] ABSTRACT

A packaging transparent propylene copolymer film stretched in at least one direction, which consists of a copolymer of propylene and an $\alpha$-olefin having 4 or more carbon atoms or a copolymer of propylene, an $\alpha$-olefin having 4 or more carbon atoms and ethylene. The copolymer satisfies the following conditions;

(1) the content of the $\alpha$-olefin having 4 or more carbon atoms in the copolymer is 8–25 mole %,
(2) the content of ethylene in the copolymer is 5 mole % or less,
(3) the content of a cold xylene-soluble portion in the copolymer is 15–50% by weight, and
(4) the flexural modulus of the copolymer is 2,500–7,000 kg/cm$^2$.

5 Claims, No Drawings

PACKAGING PROPYLENE COPOLYMER FILM

CROSS REFERENCE TO RELATED APPLICATION

This is a continuation-in-part application of application Ser. No. 649,674 filed Sept. 12, 1984 now abandoned.

FIELD OF THE INVENTION AND RELATED ART STATEMENT

This invention relates to a packaging film consisting essentially of a propylene copolymer, which film is flexible, has a high strength in at least one direction and high tear strength, and is excellent in transparency, gloss, and anti-blocking property, and which film further exhibits no shrinkage or no loss of transparency with time.

Polyvinyl alcohol films have long been used in the field of packaging films, especially the field of textile packaging films, because polyvinyl alcohol films are flexible and excellent in transparency and gloss, and has a high mechanical strength and other properties so that they impart a high-grade impression to textile articles. Polyvinyl alcohol films, however, have such defects that they are seriously affected by humidity and their properties are varied depending on the seasons so greatly that they become too soft in the rainy season while hard in winter. Moreover, they are expensive. Therefore, textile packaging films of polyolefin type which are relatively inexpensive and scarecely affected by seasons have been extensively developed in recent years.

For example, a flexible packaging film having transparency and gloss has been developed by the water cooling blown film processing or T-die cast film processing of a linear low-density polyethylene (LLDPE). However, the LLDPE film formed by said process is inferior in transparency and gloss to and much lower in strength than polyvinyl alcohol films. Also, it is well-known that a flexible packaging film with an excellent transparency and gloss is produced by the T-die cast film processing of an ethylene-propylene random copolymer having an ethylene content of about 3–5% by weight (4.5–7.5 mole %), but the strength of the film is considerably low as compared with a polyvinyl alcohol film. Stretching of this film for the purpose of improving the strength makes the strength better, but the flexibility of the film is lost and the tear strength becomes extremely bad, which causes problems in practical use. When a copolymer containing ethylene in an amount of 6% by weight (9 mole %) or more is used in order to maintain the flexibility of a film even when the stretching is effected, the film after the stretching is opacified and the transparency and the gloss are lost.

OBJECT AND SUMMARY OF THE INVENTION

In consideration of the above-mentioned situation, the present inventors have conducted extensive research, and as a result, they have found that a flexible packaging film which has an excellent transparency, a high mechanical strength and an anti-blocking property and which exhibits no shrinkage or no loss of transparency with time, is obtained by forming into a film a copolymer which comprises a specific co-monomer as the main copolymerizing component and has specific properties, preferably that obtained by a specific polymerization method, and then stretching the film thus formed in at least one direction.

According to this invention, there is provided a packaging transparent propylene copolymer film consisting of a copolymer of propylene and an α-olefin having 4 or more carbon atoms or a copolymer or propylene, an α-olefin having 4 or more carbon atoms and ethylene, said copolymer satisfying the following conditions:

(1) the content of said α-olefin having 4 or more carbon atoms in said copolymer is 8–25 mole%, (2) the content of ethylene in said copolymer is 5 mole% or less, (3) the content of a cold xylene-soluble portion in said copolymer is 15–50% by weight, and (4) the flexural modulus of said copolymer is 2,500–7,000 $kg/cm^2$, and said copolymer being stretched in at least one direction.

The first feature of the film according to this invention is that the film is flexible and excellent in transparency, gloss and anti-blocking property, and the loss of transparency with time does not occur, and hence the excellent transparency and gloss thereof are maintained.

The second feature of the film according to this invention is that the film is excellent in a mechanical strength in at least one direction and its tear strength is in a practically durable level, so that the hooking which is often used in a film bag for packaging high quality textiles becomes possible. The third feature of the film is that while conventional flexible stretched films have a problem of shrinkage with time in summer, the film according to this invention, although it is flexible, does not cause substantially shrinkage with time and can be used for a film bag for packaging high quality textiles.

DETAILED DESCRIPTION OF THE INVENTION

This invention will now be explained in detail below.

The copolymer provided for this invention can be prepared by the solvent polymerization method in which polymerization is conducted in a solvent, or the vapor phase polymerization method in which polymerization is conducted in a vapor phase. Particularly, the vapor phase polymerization method in which polymerization is conducted in the presence of substantially no liquid solvent, is appropriate for obtaining a moderately flexible copolymer of high performance, and moreover economically excellent and preferred, because the drying step of the polymer or the purification step of the solvent can be omitted or largely simplified. In the slurry polymerization method by which polymerization is carried out in an inert hydrocarbon which is generally widely used, a large amount of a soluble polymer is formed so that the yield of polymer is remarkably decreased and the method is economically disadvantageous, and furthermore no flexible polymer meeting the object of this invention is obtained.

In the solution polymerization method by which polymerization is conducted in a complete solution, polymerization temperature has to be raised up to a higher temperature in order to obtain a moderately flexible copolymer, thus causing problems that the copolymer obtained is inferior in performances or that the copolymer obtained is too flexible upon polymerization in which polymerization temperature is maintained moderately, because the content of α-olefin has to be increased for completely dissolving the resulting copolymer at a moderate temperature.

In the vapor phase polymerization method, polymerization can be carried out in a known fluidized bed type reactor, a stirring type reactor, a fluidized bed type reactor provided with a stirrer, or the like. Also, it is essential that the polymerization is carried out under such temperature and pressure conditions that the gas is not liquefied and polymer particles are not melted to form a mass, and particularly preferable polymerization conditions are such that the temperature is 40°–100° C. (preferably 50°–80° C.) and the pressure is 1–50 kg/cm$^2$ (pressure at gauge; hereinafter referred to as G). Further, it is preferable to add a molecular weight regulating agent such as hydrogen or the like for the purpose of adjusting the melt fluidity of the polymer obtained. Polymerization can be carried out batchwise, continuously or in combination of the two, and the monomer and the molecular weight regulating agent which have been consumed during polymerization can be supplemented by feeding them continuously or intermittently to the reactor.

The copolymer obtained may be subjected to post-treatment for the purpose of removing the residual catalyst, but it is more preferable for accomplishing the object of this invention substantially not to remove the solvent-soluble components.

The catalyst system used in this invention for the production of a copolymer is the so-called Ziegler-Natta catalyst system for restraining ΔHaZe of the copolymer obtained, namely catalysts consisting of a compound of a transition metal of Groups IV to VIII of the Periodic Table, an organic compound of a typical metal of Groups I to III of the Periodic Table and a third component such as an electron donating compound or the like. It is preferable that the transition metal compound or a catalyst component containing the compound be a solid. As preferable transition metal compounds, there are cited compounds containing at least titanium and a halogen, among which halogen compounds of titanium represented by the formula Ti(OR)$_n$X$_{m-n}$ wherein R is a hydrocarbon group having 1 to 20 carbon atoms, X is a halogen, m is a number of from 2 to 4 and n is a number of from 0 to m-1, are more preferable. Specific examples of such compounds are TiCl$_4$, TiCl$_3$, TiCl$_2$, Ti(OC$_2$H$_5$)Cl$_3$, Ti(OC$_6$H$_5$)Cl$_3$, etc.

The transition metal compound per se may be the main component of the catalyst or alternatively, it may be used as a catalyst component supported on an appropriate carrier.

In this invention, TiCl$_3$ among the halogeno-compounds of titanium is one of the most preferred transition metal compounds. It is known that this compound has α, β, γ and δ crystal forms. In order for an α-olefin of 3 or more carbon atoms to undergo stereoregular polymerization, TiCl$_3$ of the α, γ or δ type having a layer-like crystal form is preferred. TiCl$_3$ is generally obtained as a TiCl$_3$ composition by reducing TiCl$_4$ with hydrogen, metallic aluminum, metallic titanium, an organoaluminum compound, an organomagnesium compound or the like. Preferable TiCl$_3$ compositions are the so-called TiCl$_3$ AA obtained by reducing TiCl$_4$ with metallic aluminum and activating the resulting product by mechanical grinding, etc. and a TiCl$_3$ composition obtained by reducing TiCl$_4$ with an organoaluminum compound and activating the resulting product with a complexing agent and a halogen compound. In this invention, the latter TiCl$_3$ composition is particularly preferred. For the transition metal compound, there can also more preferably be used an alkoxy group-containing trivalent titanium halide obtained by reducing Ti(OR)$_4$ (wherein R is a hydrocarbon group of 1 to 20 carbon atoms) with an organoaluminum compound and then treating the resulting product with an ether compound and TiCl$_4$.

A particularly preferable TiCl$_3$ composition or alkoxy group-containing trivalent titanium halide is that which is able to produce at least 6,000 g of a polypropylene per gram when a system containing liquefied propylene, hydrogen diethylaluminum chloride and the TiCl$_3$ composition or the alkoxy group-containing trivalent titanium halide is subjected to polymerization at 65° C. for 4 hr. Such a TiCl$_3$ composition can be produced by the methods disclosed in U.S. Pat. Nos. 4,210,738 and 4,165,298, Japanese Patent Application Kokai (Laid-Open) No. 142,904/83, Japanese Patent Application No. 138,471/83, etc. Also, such an alkoxy group-containing trivalent titanium halide can be produced by the methods disclosed in Japanese Patent Application Kokai (Laid-Open) No. 126,401/84, etc.

When the transition metal compound is used as the catalyst component supported on an appropriate carrier, the carrier may be various solid polymers, particularly, α-olefin polymers; various solid organic compounds, particularly, solid hydrocarbons; various solid inorganic compounds, particularly, oxides, hydroxides, carbonates and halides; and so forth. Preferable carriers are magnesium compounds such as magnesium halides, magnesium oxides, magnesium hydroxides, magnesium hydroxyhalides and the like. These magnesium compounds may be used as a complex with other solid substances mentioned above. As the magnesium compounds, commercially available ones may be used as they are, but preferred are those obtained by mechanically grinding a commercially available magnesium compound or by dissolving it in a solvent and then allowing it to precipitate or by treating it with an electron-donating compound or an active hydrogen compound, or by decomposing an organomagnesium compound such as a Grignard reagent. In many cases, these procedures for obtaining a preferable magnesium compound are preferably used in combination. These procedures may be conducted at the time of the production of a carrier or the catalyst component. Particularly preferable magnesium compounds are magnesium halides, and particularly preferable transition metal compounds are titanium halides as mentioned above. Therefore, a carrier-supported catalyst component composed essentially of a magnesium halide and a titanium halide is one of the most preferred catalyst components in this invention and can be produced by the methods disclosed in Japanese Patent Application Kokai (Laid-Open) No. 30,407/81, Japanese Patent Application Kokai (Laid-Open) No. 59,915/82, etc.

A complex catalyst which is not of a carrier-supported type and comprises titanium, magnesium and a halogen as the major components is also one of the most preferred catalyst components and can be produced by the methods disclosed in Japanese Patent Application No. 59792/85 and the like.

For stereoregular polymerization of an α-olefin having 3 or more carbon atoms, it is preferable to use a carrier-supported catalyst component or complex catalyst comprising a magnesium halide and a halogen as the essential components and also comprising an electron-donating compound.

As the organic compound of a typical metal of Groups I to III of the Periodic Table, organoaluminum compounds are preferred. Particularly preferred are organoaluminum compounds represented by the formula $R_eAlX_{3-e}$ wherein R is a hydrocarbon group having 1 to 20 carbon atoms, X is hydrogen atom or a halogen atom and e is a number of 1 to 3. Specific examples of these compounds are triethylaluminum, triisobutylaluminum, diethylaluminum hydride, diethylaluminum chloride, diethylaluminum bromide, ethylaluminum sesquichloride, ethylaluminum dichloride, etc. The most preferable compounds are triethylaluminum, diethylaluminum chloride and their mixture.

The electron-donating compound used in the preparation of the solid catalyst component and polymerization steps includes esters and acid anhydrides such as ethyl acetate, ε-caprolactone, methyl methacrylate, ethyl benzoate, ethyl p-anisate, methyl p-toluate, phthalic anhydride; ether compounds such as di-n-butyl ether, diphenyl ether, diethylene glycol dimethyl ether and the like; organophosphorus compounds such as tri-n-butyl phosphite, triphenyl phosphite and hexamethylene phosphoric triamide; etc. Further, it includes ketones; amines; amides; thioethers; organosilicon compounds such as alkoxysilanes and aryloxysilanes both having a Si-O-C bond; etc.

The solid catalyst component may be treated, before its use in the polymerization of this invention, with a small amount of an olefin in the presence of an organoaluminum compound alone or together with an electron-donating compound to undergo pre-polymerization.

In the copolymer used as a resin in this invention, an α-olefin having 4 or more carbon atoms or a combination of the α-olefin and a very small amount of ethylene is used as comonomers. As the α-olefin having 4 or more carbon atoms, there may be used butene-1, pentene-1, hexene-1, 4-methylpentene-1 or the like alone or in admixture of two or more, and among them, butene-1 is most preferable because it is difficult to liquefy and a high partial pressure can be obtained. When the major component of the comonomers is an α-olefin having 4 or more carbon atoms if the ethylene content exceeds a specific level, there occur deterioration of transparency and loss of transparency with time which seems to be due to the bleeding of an atactic component, so that such condition is not desired. The content of an α-olefin having 4 or more carbon atoms in the copolymer used in this invention is 8-25 mole%, preferably 10-22 mole %.

If the content of an α-olefin having 4 or more carbon atoms is smaller than the above-mentioned range, the flexibility of the copolymer is lost, and hence, such condition is not desired. If the content exceeds the above-mentioned upper limit, the film causes shrinkage with time or is too flexible, the transparency of the film is deteriorated with time, and the anti-blocking property and tear strength are inferior, so that such condition is not desired.

The ethylene content of the copolymer used in this invention is 5 mole % or less, preferably 3 mole % or less. If the ethylene content exceeds the above-mentioned upper limit, the transparency of the film is deteriorated with time even if the content of an α-olefin having 4 or more carbon atoms is comparatively small, and thus such condition is not desired. The reason, although not clear, seems to be due to the more bleeding of an atactic component in the case of ethylene as a comonomer as compared with the case of an α-olefin having 4 or more carbon atoms. As copolymerization, there is preferably adopted random copolymerization in which monomers and comonomers are charged and polymerized in the same time, but it is also possible to carry out polymerization while changing stepwise or continuously the composition of the monomers to be polymerized.

The content of the cold xylene soluble portion (CXS) of the copolymer used in this invention is 15-50% by weight, preferably 16-40% by weight. If the CXS is less than the above-mentioned lower limit, the softness of the copolymer is lost and finally the flexibility of the film is lost even if the content of the comonomers is more than the above-mentioned lower limit, and thus such condition is not desired. If the CXS exceeds the above-mentioned upper limit, the film is too soft and causes shrinkage with time, the transparency of the film is deteriorated with time, and anti-blocking property and tear strength are inferior, and thus such condition is not desired.

The ΔHaze of the copolymer used in this invention is 7% or less, preferably 5% or less, and more preferably 4% or less.

If the Δ Haze exceeds the above-mentioned upper limit, deterioration of the transparency of the film with time occurs and also the anti-blocking property is deteriorated, and thus such condition is not desired.

The boiling n-heptane insoluble portion (BHIP) of the copolymer used in this invention is not critical, but preferably 7% or more by weight.

If the copolymer having a BHIP less than 7% by weight is used, the blocking property of the film becomes somewhat bad.

The flexural modulus of the copolymer used in this invention is 2,500-7,000 kg/cm$^2$, preferably 3,000-6,500 kg/cm$^2$. If the flexural modulus is less than the above-mentioned lower limit, the film is too flexible, the transparency of the film is deteriorated with time, shrinkage is caused with time and tear strength and anti-blocking property are inferior, and thus such condition is not desired. If the flexural modulus exceeds the above-mentioned upper limit, the flexibility of the film is lost, a film having a uniform thickness is hardly obtained by stretching with a low draw ratio and tear strength is inferior, and thus such condition is not desired.

The tensile strength of the copolymer used in this invention is preferably 200 kg/cm$^2$ or more, and the elongation is preferably 300% or more. If the values of the tensile strength and the elongation are less than the above-mentioned limits, the toughness of the film obtained is insufficient, and thus such condition is not desired.

Components soluble in a medium solvent have been conventionally avoided as a worthless noncrystalline component, because they deteriorate the blocking property of a film, and causes the loss of transparency with time (for example, see page 1, lines 35-65 of U.S. Pat. No. 4,367,322). However, it has been surprisingly found that in this invention the above-mentioned problems do not occur by using a copolymer which satisfies the above-mentioned various limits substantially without removing the solvent soluble portion, and thus the object of this invention can be accomplished.

Furthermore, it is generally known that tear property is deteriorated by stretching, but it is unexpected that the problem of shrinkage with time of a film has been solved, and stretching with a low draw ratio has been made easier, and furthermore tear strength has been improved for the first time by setting the content of an α-olefin, CXS, flexural modulus and the like of the copolymer within the above-mentioned ranges.

The copolymer used in this invention can be blended with a small amount of other polymeric substances. An antistat, an anti-blocking agent, a slip agent, a stabilizer and the like can be added thereto.

As a method for the film-forming of the copolymer in this invention, there can be used well-known processes such as the T-die casting method, the water-cooling blown method and the like. As a method for stretching in at least one direction, there can be used well-known uniaxial stretching methods such as roll stretching, compression rolling and the like, and well-known biaxial stretching methods such as flat biaxial stretching, tubular biaxial stretching and the like, but biaxial stretching is more preferable because a balanced film is obtained thereby. The copolymer of this invention is characterized in that stretching with a low draw ratio can be preferably conducted even in the flat biaxial stretching method by which generally distribution of a uniform thickness can hardly be obtained in stretching with a low draw ratio.

Stretching temperature is in the range from ambient temperature to the melting point of the copolymer or less, preferably in the range of 100°–130° C. Draw ratio is in the range of 1.2–5 times, preferably 1.3–4 times, more preferably 1.5–3 times. If the draw ratio exceeds the above-mentioned upper limit, tear strength of the film is inferior even if the above-mentioned properties of the copolymer are in the above-mentioned ranges, and thus such condition is not desired. If the draw ratio is less than the above-mentioned lower limit, strength of the film is insufficient, and thus such condition is not desired. In order to effectively prevent the shrinkage with time of the film, it is preferred that heat setting (annealing) after stretching is conducted.

Heat setting is conducted preferably at a temperature of (stretching temperature-10)°C. or more, more preferably at a temperature of 110° C. or more.

As the physical properties of the film thus obtained, tear strength is 7 g or more, preferably 10 g or more, more preferably 15 g or more. If the tear strength is less than the above-mentioned limit, tearing occurs easily from hooking part or the like, and thus such condition is not desired. The Young's modulus in MD and TD is preferably 2,000–7,000 kg/cm$^2$, more preferably 2,000–6,000 kg/cm$^2$. If the Young's modulus is less than the above-mentioned lower limit, the film is too flexible as compared with polyvinylalcohol film, and thus such condition is not desired. If the Young's modulus exceeds the above-mentioned upper limit, softness like polyvinylalcohol film is lost, and thus such condition is not desired. The breaking strength in at least one direction of the film is preferably 400 kg/cm$^2$ or more. If the strength is less than 400 kg/cm$^2$, hooking resistance is lost (the film is stretched in the opening direction of a hook of a bag by repeated use of the hook, and the commercial value of the bag is lost), and thus such condition is not desired.

The shrinkage resistance property of the film of this invention is that a film having a small shrinkage can be provided even if the Young's modulus is comparatively small, and that the shrinkage (Y, %) at 100° C. and the Young's modulus (X, kg/cm$^2$) have a relationship satisfying the following inequality:

$$Y < 50 - 0.0035X.$$

It is preferred that it satisfies the following inequality:

$$Y < 35 - 0.002X.$$

If the shrinkage factor of a film is large, the film gradually causes shrinkage with time in summer, and creases generate on sealing by fusing, and thus it becomes poor in practical value. Therefore, this invention is to provide an excellent film which is flexible and has no shrinkage with time as compared with that obtained by the well-known methods.

The packaging propylene copolymer film thus prepared has flexibility, transparency and gloss very resemble to those of polyvinylalcohol film and is capable of being subjected to hooking. Moreover, it shows little seasonal variation of physical properties unlike polyvinylalcohol film and has a very large practical value that it can be prepared with a low cost.

DESCRIPTION OF PREFERRED EMBODIMENTS

This invention will be explained in more detail below referring to Examples and Comparative Examples; however it should not be interpreted that the invention be limited to the Examples.

The data and evaluation values in the Examples and Comparative Examples were obtained in the following ways:

(1) The α-olefin content in copolymer

It was obtained from material balance in producing the copolymer. As for the content of butene-1, the material balance was confirmed by determining in the usual way the amount based on the characteristic absorption at 770 cm$^{-1}$ which was obtained with an infrared spectrometer. In the measurement by means of an infrared spectrometer, a calibration curve of a propylene-butene-1 copolymer was prepared from the amounts determined by means of $^{13}$C-NMR, and the determination of amount was made based thereon.

(2) The ethylene content in copolymer

It was obtained from material balance. The determination of amount was conducted in the usual way based on the characteristic absorptions at 732 cm$^{-1}$ and 720 cm$^{-1}$ which were obtained with an infrared spectrometer, whereby the result of the material balance was confirmed. Further, in the measurement by means of an infrared spectrometer, a calibration curve of an ethylene copolymer was prepared based on the amounts determined by the radiation measurement of $^{14}$C-labelled ethylene copolymer, and the determination of amount was made based thereon.

(3) Cold xylene-soluble portion (CXS)

In 500 ml of xylene was dissolved 5 g of a polymer, and the mixture was gradually cooled down to room temperature. Then, the mixture was allowed to stand in a bath at 20° C. for 4 hours and thereafter filtered, and the filtrate was concentrated to dryness. The solid thus obtained was weighed.

(4) Intrinsic viscosity [η]

Viscosities were measured at different concentrations of 0.4, 0.2, 0.133 and 0.1 g/dl in the usual way in tetralin at 135° C.

(5) ΔHaze

A press sheet of a copolymer with a thickness of 100μ was prepared and annealed at 60° C. for 9 hours. ΔHaze was expressed by the difference between the haze values before and after annealing. The haze was determined by the method mentioned in item (10) appearing hereinafter.

(6) Flexural modulus

It was obtained in accordance with ASTM-D790. (Preparation of samples were carried out in accordance with JIS-K6758.)

Shape of a test piece: 2 mm of thickness×20 mm of width×50 mm of length
Distance between chucks: 30 mm
Deformation speed: 1 mm/minute (7) Boiling n-heptane-insoluble portion (BHIP)

Extraction was conducted for 14 hr by the use of a Soxhlet extractor. The frequency of refluxing was once every 5 min. The extraction residue was dried and weighed to obtain a BHIP.

(8) Tensile property of pressed sheet and film

It was obtained in accordance with ASTM-D882, wherein tensile speed: 200 mm/minute. (Preparation of the samples of the pressed sheet was carried out in accordance with JIS-K6758.)

(9) Young's modulus of film

It was obtained in accordance with ASTM-D882, wherein shape of a test piece: a strip of 20×120
distance between chucks: 50 mm
tensile speed: 5 mm/min

(10) Haze

It was obtained in accordance with ASTM-D1003.

(11) Gloss

It was obtained in accordance with ASTM-D523.

(12) Tear strength

It was obtained in accordance with JIS K6772.

(13) Blocking degree

Conditioning was conducted while applying 7 kg of loading per 100 cm$^2$ of area of two films superposed on each other at a temperature of 23° C. for 24 hours. Then, the two films were peeled at a loading increasing speed of 10 g/minute to the rectangular direction against the surfaces of the films, and the maximum loading (g) was obtained and expressed as a reduced value per 100 cm$^2$ of the film area.

(14) Shrinkage factor

It was expressed as a variation rate in size upon dipping in a glycerin bath at 100° C. for 30 minutes.

EXAMPLE 1

(1) Preparation of a titanium trichloride-containing solid catalyst

After a 1-liter flask provided with a stirrer and a dropping funnel was purged with argon, a solution consisting of 60 ml of titanium tetrachloride and 228 ml of n-heptane was placed in said flask, and a solution of 136.6 ml of ethyl-aluminium sesquichloride and 300 ml of n-heptane was dropped thereinto at a temperature of $-5°$ to $-10°$ C. over a period of 2 hours. After the completion of dropping, the resulting mixture was stirred at room temperature for 30 minutes, and then the temperature of the mixture was raised to 80° C. The mixture was subjected to heat treatment at 80° C. for 1 hour, and then allowed to stand at room temperature to separate solid and liquid. The solid obtained was then washed with four 400-ml portions of heptane.

Subsequently, 580 ml of n-heptane and 5 ml of diethylaluminum chloride were placed in the flask, and the temperature of the contents of the flask was maintained at 50° C. While stirring the contents, 32 g of propylene was slowly fed to the resulting suspension at 50° C. over a period of 2 hours, and the pre-polymerization treatment of propylene was conducted. After the treatment, the pre-polymerization mixture was separated into solid and liquid, and the solid obtained was washed with two 400-ml portions of n-heptane.

Subsequently, 392 ml of toluene was placed in the flask and the temperature of toluene was maintained at 85° C. While stirring the toluene, 117 ml of n-butyl ether and 3.7 ml of tri-n-octylamine were added to the toluene, and the resulting mixture was subjected to reaction at 85° C. for 15 minutes. After the reaction, a solution of 15.5 g of iodine in 196 ml of toluene was added to the reaction mixture, and the resulting mixture was further subjected to reaction at 85° C. for 45 minutes.

After the reaction, the reaction mixture was separated into solid and liquid, and the solid obtained was washed with 500 ml of toluene and then three 500-ml portions of n-heptane, and dried under reduced pressure to obtain 90 g of a titanium trichloride-containing solid catalyst. This solid catalyst contained 65.2% by weight of titanium trichloride.

(2) Copolymerization

By using a fluidized bed type reactor having an internal volume of 1 m$^3$ provided with a stirrer, copolymerization of propylene and butene-1 was conducted. First of all, 60 kg of propylene-butene-1 copolymer particles for dispersing catalysts were fed to the reactor, which reactor was then purged with nitrogen and then with propylene. The internal pressure of the reactor was raised to 5 kg/cm$^2$ G with propylene, and a circulation gas was fed from the bottom of the reactor at a flow rate of 80 m$^3$/hour to maintain the polymer particles in the fluidized state. Subsequently, the following catalysts were supplied to the reactor, in which the catalyst components (b) and (c) were used in the form of a heptane solution:

| (a) | titanium trichloride-containing solid catalyst | 21 g |
|---|---|---|
| (b) | diethylaluminum chloride | 112 g |
| (c) | triethylaluminum | 11 g |
| (d) | methyl methacrylate | 8 g |

Subsequently, hydrogen, propylene and butene-1 were fed to said reactor so that the concentrations of hydrogen and butene-1 could be 1.7% by volume and 20% by volume, respectively, and the internal pressure of the reactor was raised to 10 kg/cm$^2$ G, after which the temperature of the fluidized bed was adjusted to 65° C. to initiate polymerization. During the polymerization, hydrogen, propylene and butene-1 were supplied so as to maintain the concentrations of hydrogen and butene-1 and the pressure constant. When 75 kg of a polymer was formed in addition to the 60 kg of the propylene-butene-1 copolymer initially added to the reactor, 60 kg of the polymer particles were left in the reactor for dispersing a catalyst for the next polymerization, and the residual polymer particles were transferred to a stirring mixing tank. To said mixing tank were added 210 g of propylene oxide and 100 g of methanol, and the resulting mixture was treated at 80° C. for 30 minutes. Subsequently, the treated mixture was dried to obtain a white powdery polymer. In the above reactor, the second and third polymerization procedures with after-treatments were successively carried out under the same conditions as in the first polymerization. The physical properties of the polymer obtained in the third polymerization procedure were measured.

The content of butene-1 in this copolymer was 17.3 mole %, the CXS was 29.6% by weight, the intrinsic viscosity was 1.9 dl/g, the flexural modulus was 4100 kg/cm$^2$, the ΔHaze was 2.0% and the BHIP was 22.8% by weight.

(3) Film formation

From the copolymer obtained in (2), a raw fabric film having a thickness of 270μ was prepared under the following processing conditions:
extruder: 65 mmφ extruder, manufactured by Egan Company. screw: single full-flight type, L/D=24, C, R=4.0 temperature condition: 230° C.,
die: coat hanger die, lip clearance 0.9 mm, width 500 mm
take up speed: 3 m/minute.

From this raw fabric film, a biaxially stretched film having a thickness of 30μ was prepared under the following stretching conditions. Physical properties of the film are shown in Table 1.
stretching machine:
  tenter biaxial stretching machine (manufactured by the Japan Steel Works Ltd.)
stretching conditions:
  line speed at the inlet side 3 m/minute,
  line speed at the outlet side 9 m/minute,
  MD draw ratio, 3,
  TD draw ratio, 3,
temperature conditions:
  MD stretching, 120° C.,
  TD stretching
    at pre-heating zone, 120° C.,
    at stretching zone, 120° C.,
    at annealing zone, 120° C.

The biaxially stretched film was flexible and was excellent in transparency and gloss. It also had tensile strengths in both directions of MD and TD sufficient to ensure that hooking is capable and a tear strength sufficient to be resistant against tearing from the hooked part. Furthermore, it was a film causing no gradual shrinkage with time.

EXAMPLE 2

Under the same polymerization conditions as in Example 1 except that the charged amount of butene-1 was changed in the catalyst system used in Example 1, a copolymer was obtained. The content of butene-1 in the copolymer obtained was 14.6 mole %, the CXS was 24.8% by weight, the intrinsic viscosity was 1.8 dl/g, the flexural modulus was 5300 kg/cm$^2$, the ΔHaze was 0.3% and the BHIP was 29.5%. Under the same stretching conditions shown in Example 1 except that the temperature condition was changed in 125° C., a biaxially stretched film was prepared from the copolymer. The physical properties of the film are shown in Table 1. The film was also a preferred film similar to that obtained in Example 1.

EXAMPLE 3

Under the same polymerization conditions as in Example 1 except that the charged amount of butene-1 was changed and ethylene was newly charged in the catalyst system used in Example 1, a copolymer was obtained. The content of butene-1 in the copolymer obtained was 12.5 mole %, the content of ethylene was 1.4 mole %, the CXS was 32.7% by weight, the intrinsic viscosity was 1.9 dl/g, the flexural modulus was 3900 kg/cm$^2$, the ΔHaze was 2.8% and the BHIP was 15.8%. A biaxially stretched film was obtained from the copolymer under the same conditions as those shown in Example 1. The physical properties are shown in Table 1. The film was also a preferred film similar to that obtained in Example 1.

EXAMPLE 4

(1) Preparation of solid product

After a flask having an internal volume of 500 ml provided with a stirrer and a dropping funnel was purged with argon, 83 ml of n-heptane, 16.1 ml of titanium tetrachloride and 51.0 ml of tetra-n-butoxytitanium was added to the flask. The temperature of the content of the flask was maintained at 20° C. with stirring. A solution consisting of 162.1 ml of n-heptane and 37.8 ml of diethylaluminium chloride was gradually dropped through the funnel into the flask over a period of 3 hours while the temperature of the content is maintained at 20° C. After the completion of dropping, the temperature of the mixture was raised to 50° C., and stirring was conducted for 1 hour. Then, the mixture was allowed to stand at room temperature to separate solid and liquid. The solid was washed with four 200 ml portions of n-heptane and dried under reduced pressure to obtain 64.7 g of a reddish brown solid product.

(2) Preparation of preliminarily polymerized solid

After a flask having a volume of 300 ml provided with a stirrer was purged with argon, 241 ml of n-heptane, 0.34 g of triethylaluminum and 19.7 g of the solid product prepared in the above-mentioned (1) were placed in the flask, and the temperature was maintained at 50° C. Then, ethylene was slowly provided into the suspension under stirring while maintaining the partial pressure to 0.2 kg/cm$^2$ at 50° C. for 20 minutes to carry out preliminary polymerization treatment. After the treatment, the separation of solid and liquid was conducted, and the solid was washed twice with 50 ml portions of n-heptane and dried under reduced pressure. The amount obtained in the preliminary polymerization was 0.09 g of the polymer per 1 g of the solid product.

(3) Preparation of solid catalyst component

After a flask having an internal volume of 100 ml was purged with argon, 12.1 g of the preliminarily polymerized solid prepared in the above-mentioned (2) and 42.3 ml of n-heptane were placed in the flask, and the temperature of the content was maintained at 30° C. Then, 14.4 ml of di-iso-amyl ether was added to the mixture, and the treatment was carried out at 30° C. for 1 hour. Then, the temperature of the mixture was raised to 75° C. At a temperature of 75° C., 15.7 ml of titanium tetrachloride was added thereto, and the reaction was conducted at 75° C. for 1 hour. After the separation of solid and liquid, the solid was washed with four 50 ml portions of n-heptane and dried under reduced pressure to obtain the solid component. Furthermore, after a flask having an internal volume of 100 ml was purged with argon, 9.9 g of the above-mentioned solid component and 38 ml of n-heptane were placed in the flask, and the temperature of the content was maintained at 30° C. Then, 8.5 ml of di-iso-amyl ether was added thereto, and the mixture was treated at 30° C. for 1 hour. Then, the temperature of the mixture was raised to 75° C. At a temperature of 75° C., 11.5 ml of titanium tetrachloride was added thereto, and the reaction was conducted at 75° C. for 1 hour. After the separation of solid and liquid, the solid was washed with four 50 ml portions of n-heptane, and dried under reduced pressure to obtain the solid catalyst component.

(4) Copolymerization

A copolymer was obtained under the same polymerization conditions as those in Example 1 except that the following catalyst system was used, the charged monomer proportions were changed and the temperature was changed to 70° C.:

| | | |
|---|---|---|
| (a) | solid catalyst component | 21 g |
| (b) | diethylaluminium chloride | 156 g |
| (c) | triethylaluminium | 22 g |
| (d) | methyl methacrylate | 15 g |

The content of butene-1 in the copolymer was 19.0 mole %, the CXS was 27.5% by weight, the intrinsic viscosity was 1.9 dl/g, the flexural modulus was 4000 kg/cm$^2$, the ΔHaze was 0.5% and the BHIP was 19.7%.

A biaxially stretched film was obtained from the copolymer under the same stretching conditions as those shown in Example 1.

The physical properties of the film are shown in Table 1. The film was a preferred film similar to that obtained in Example 1.

EXAMPLE 5

A copolymer was obtained under the same polymerization conditions as those in Example 4 except that 4-methyl-1-pentene was newly added and the charged monomer proportions were changed. The content of an α-olefin in the copolymer was 17.1 mole % (content of butene-1, 14.0 mole %; content of 4-methyl-1-pentene, 3.1 mole %), the CXS was 26.3% by weight, the intrinsic viscosity was 1.8 dl/g, the flexural modulus was 4300 kg/cm$^2$, the ΔHaze was 0.4% and the BHIP was 20.5%. A biaxially stretched film was obtained from this copolymer under the same stretching conditions as those shown in Example 1.

The physical properties of the film are shown in Table 1. The film was a preferred film similar to that obtained in Example 1.

COMPARATIVE EXAMPLE 1

A copolymer was obtained under the same polymerization conditions as those in Example 1 except that ethylene was charged in place of butene-1 in the catalyst system used in Example 1. The content of ethylene in the copolymer obtained was 11.6 mole %, the CXS was 27.1% by weight, the intrinsic viscosity was 1.8 dl/g, the flexural modulus was 2,800 kg/cm$^2$ and the ΔHaze was 18.3%. A biaxially stretched film was obtained from this copolymer under the same stretching conditions as those in Example 1 except that the temperature condition was changed to 100° C. This film was bad in transparency, which was further remarkably deteriorated with time, and thus it could hardly be provided for practical use.

COMPARATIVE EXAMPLE 2

The copolymer of this example is that which was obtained by the slurry polymerization method using n-heptane as a solvent, and from which an atactic component soluble in n-heptane was removed. The content of ethylene in this copolymer was 9.5 mole %, the CXS was 9.6% by weight, the intrinsic viscosity was 1.8 dl/g, the flexural modulus was 4900 kg/cm$^2$ and the ΔHaze was 1.2%. A biaxially stretched film was obtained from this copolymer under the same conditions as those shown in Example 1. The pysical properties of the film are shown in Table 1. This film caused whitening on stretching and was inferior in transparency.

COMPARATIVE EXAMPLE 3

This copolymer is that which was obtained by the slurry polymerization method using n-heptane as a solvent, and from which a component soluble in n-heptane was removed. The content of butene-1 in this copolymer was 14.3 mole %, the CXS was 9.5% by weight, the intrinsic viscosity was 1.9 dl/g, the flexural modulus was 7300 kg/cm$^2$ and the ΔHaze was 1.5%. A biaxially stretched film was obtained from this copolymer under the same stretching conditions as those shown in Example 1 except that the temperature condition was changed to 125° C. However, the film thus obtained was considerably inferior in distribution of thickness in the TD direction as compared with those in Examples 1–5. The physical properties of the film are shown in Table 1. The film was inferior in flexibility and not so good in tear strength.

COMPARATIVE EXAMPLE 4

(1) Copolymerization

After a 100 liter autoclave equipped with a stirrer, a thermometer, a dropping funnel and a reflux condenser was subjected to pressure reduction, it was purged with nitrogen. Into this autoclave was placed 50 liters of dried n-hexane. The solvent was maintained at a constant temperature of 50° C., and a mixed gas comprising 71 mole % of propylene and 29 mole % of butene-1 was introduced thereinto at a rate of 0.28 Nm$^3$/minute. Then, 30 g of diethylaluminium chloride and 1.65 g of ε-caprolactone were added as a catalyst, and furthermore 3 g of the same solid catalyst as used in Example 4 was added to initiate polymerization. Polymerization was conducted under stirring for 120 minutes while continuously flowing the mixed gas of propylene and butene-1. Then, after the reaction was stopped by adding 1.5 liters of butanol and the mixture was sufficiently washed with butanol, the reaction product was poured into a large amount of methanol to deposit the copolymer. The intrinsic viscosity of this copolymer was 2.2 dl/g, the content of butene-1 was 26.5 mole %, the CXS was 56% by weight, the flexural modulus was 2200 kg/cm$^2$, the ΔHaze was 3.5% and the BHIP was 6.1%.

(2) Film formation

A biaxially stretched film was formed from the copolymer obtained in the above-mentioned (1) under the same stretching conditions as those shown in Example 1 except that the temperature condition was changed to 90° C. (At a temperature exceeding 90° C., sticking of the film to the line is caused, and this problem is hard to be solved.) The physical properties of the film are shown in Table 1. This film had a so large blocking degree as 100 g/100 cm$^2$ or more (blocking degrees of the films in Examples were 20 g/100 cm$^2$ or less) and was not so good in tear strength. It also caused shrinkage with time in summer, and thus it was not a film which could be supplied for practical use.

COMPARATIVE EXAMPLE 5

(1) Copolymerization

After a 100 liter autoclave equipped with a stirrer, a thermometer, a dropping funnel and a reflux condenser was subjected to pressure reduction, it was purged with nitrogen. Into this autoclave was placed 50 liters of dried n-heptane, and the solvent was maintained at a constant temperature of 50° C. A mixed gas comprising 64 mole % of propylene and 36 mole % of butene-1 was introduced thereinto at a rate of 0.28 Nm³/minute. Then, 40 g of diethylaluminium chloride was added thereto as a catalyst, and furthermore 10 g of the same solid catalyst as used in Example 1 was added to initiate polymerization. Polymerization was conducted under stirring for 60 minutes while continuously flowing the mixed gas of propylene and butene-1. Then, after the reaction was stopped by adding 1.5 liters of butanol and the mixture was sufficiently washed with butanol, the reaction product was poured into a large amount of methanol to deposit the copolymer. The intrinsic viscosity of the copolymer was 2.0 dl/g, the content of butene-1 was 30.8 mole %, the CXS was 69% by weight, the flexural modulus was 2000 kg/cm², the ΔHaze was 8.1% and the BHIP was 5.6%.

(2) Film formation

A biaxially stretched film was formed from the copolymer obtained in the above-mentioned (1) under the same stretching conditions as those shown in Example 1 except that the temperature condition was changed to 90° C. (At a temperature exceeding 90° C., sticking of the film to the line is caused, and this problem is hard to be solved.) The physical properties of the film are shown in Table 1. This film had a so bad blocking degree as 100 g/100 cm² or more, and showed transparency deterioration with time. The tear strength was either not so good, and shrinkage with time was observed in summer, so that the film was not the one which can be supplied for practical use.

COMPARATIVE EXAMPLE 6

A biaxially stretched film was formed from the copolymer used in Example 1 under the same conditions as those shown in Example 1 except that draw ratios were changed to 4 in MD and 7 in TD. A raw fabric film having a thickness of 840μ was used. The physical properties of the film are shown in Table 1. This film was poor in flexibility and inferior in tear strength, and thus it was difficult to supply the film for practical use.

We claim:

1. A packaging transparent propylene copolymer film consisting of a copolymer of propylene and butene-1 or a copolymer of propylene, butene-1 and ethylene obtained by a polymerization method in which the solvent-soluble components are not substantially removed, using a catalyst system consisting of a solid compound containing at least titanium and a halogen, an organoaluminum compound and an electron-donating compound, said copolymer satisfying the following conditions:
   (1) the content of butene-1 in said copolymer is 10–22 mole %,
   (2) the content of ethylene in said copolymer is 3 mole % or less,
   (3) the content of cold xylene-soluble portion in said copolymer is 15–50% by weight,
   (4) the content of boiling n-heptane insoluble portion in said copolymer is 7% or more by weight,
   (5) the ΔHaze of said copolymer is 4% or less, and
   (6) the flexural modulus of said copolymer is 2,500–7,000 kg/cm²,
   said copolymer being stretched in at least one direction in a draw ratio of 1.2–5.

2. A packaging transparent copolymer film according to claim 1, wherein the Young's modulus in MD and TD is 2,000–7,000 kg/cm² and the strength at break in at least one direction is 400 kg/cm² or more.

3. A packaging transparent copolymer film according to claim 2, wherein the relationship between shrinkage (Y, %) at 100° C. and Young's modulus (X, kg/cm²) satisfies the following inequality:

$$Y < 50 - 0.0035X.$$

4. A packaging transparent copolymer film according to claim 1, wherein tear strength in MD and TD is 7 g or more.

5. A packaging transparent copolymer film according to claim 1, wherein the film is subjected to stretching treatment of biaxial stretching.

* * * * *

TABLE

| Items | | Example 1 | Example 2 | Example 3 | Example 4 | Example 5 |
|---|---|---|---|---|---|---|
| Young's modulus (Kg/cm²) | | 3700/3800 | 4400/4500 | 3700/3600 | 3700/3600 | 3900/4000 |
| Tensile Properties | Strength at break (Kg/cm²) | 550/570 | 570/560 | 530/520 | 560/580 | 570/560 |
| | Elongation (%) | 340/330 | 290/300 | 320/330 | 310/330 | 320/320 |
| Haze (%) | | 1.0 | 0.9 | 1.1 | 0.9 | 1.0 |
| Gloss (%) | | 145 | 145 | 144 | 146 | 145 |
| Tear strength (g) | | 40/33 | 36/34 | 37/41 | 43/41 | 39/37 |
| Shrinkage factor (%) | | 7/7 | 4/5 | 6/7 | 6/6 | 6/5 |

| Items | | Comparative Example 2 | Comparative Example 3 | Comparative Example 4 | Comparative Example 5 | Comparative Example 6 |
|---|---|---|---|---|---|---|
| Young's modulus (Kg/cm²) | | 4000/4100 | 7500/7400 | 2800/2900 | 2500/2600 | 5700/9100 |
| Tensile Properties | Strength at break (Kg/cm²) | 510/500 | 650/670 | 710/700 | 690/680 | 780/1300 |
| | Elongation (%) | 310/280 | 250/230 | 190/200 | 210/200 | 220/70 |
| Haze (%) | | 4.9 | 1.5 | 0.8 | 1.6 | 0.9 |
| Gloss (%) | | 111 | 140 | 147 | 138 | 146 |
| Tear strength (g) | | 25/20 | 15/14 | 12/14 | 13/12 | 17 < 5 |
| Shrinkage factor (%) | | 6/7 | 3/3 | 45/47 | 47/49 | 8/11 |